US011052386B2

(12) United States Patent
Okuya et al.

(10) Patent No.: US 11,052,386 B2
(45) Date of Patent: Jul. 6, 2021

(54) PROCESSING METHOD OF BASE MATERIAL SHEET, MANUFACTURING METHOD OF MODIFIED BASE MATERIAL SHEET, BASE MATERIAL WITH GRAFTED POLYMER CHAIN, AND ION EXCHANGE MEMBRANE

(71) Applicant: AGC Engineering Co., Ltd., Chiba (JP)

(72) Inventors: Tamao Okuya, Chiba (JP); Junichi Tayanagi, Chiba (JP)

(73) Assignee: AGC Engineering Co., Ltd., Chiba (JP)

( * ) Notice: Subject to any disclaimer, the term of this patent is extended or adjusted under 35 U.S.C. 154(b) by 0 days.

(21) Appl. No.: 16/265,379

(22) Filed: Feb. 1, 2019

(65) Prior Publication Data
US 2019/0160457 A1 May 30, 2019

Related U.S. Application Data

(63) Continuation of application No. PCT/JP2017/029021, filed on Aug. 9, 2017.

(30) Foreign Application Priority Data

Aug. 10, 2016 (JP) .............................. JP2016-157874

(51) Int. Cl.
*B01J 47/12* (2017.01)
*C08F 255/02* (2006.01)
(Continued)

(52) U.S. Cl.
CPC .............. *B01J 47/12* (2013.01); *B01J 19/00* (2013.01); *B01J 41/07* (2017.01); *B01J 41/14* (2013.01);
(Continued)

(58) Field of Classification Search
CPC .. B01J 47/12; B01J 41/14; B01J 41/07; C08F 255/02; C08F 259/04; C08F 259/08;
(Continued)

(56) References Cited

U.S. PATENT DOCUMENTS 2,067,488 A * 1/1937 Hough, Jr. ............... D06B 3/10
156/237
2004/0087677 A1 5/2004 Sugo et al.

FOREIGN PATENT DOCUMENTS

JP 2000-53788 2/2000
JP 2000053788 A * 2/2000
(Continued)

OTHER PUBLICATIONS

Machine_English_translation_JP_2000053788_A; Sugo, T.; Radiation Graft Polymerization; Feb. 22, 2000; EPO; whole document (Year: 2000).*

(Continued)

*Primary Examiner* — Tahseen Khan
(74) *Attorney, Agent, or Firm* — Oblon, McClelland, Maier & Neustadt, L.L.P.

(57) ABSTRACT

A processing method of a base material sheet includes winding out the base material sheet wound up by a first core and a first porous sheet wound up by a second core, winding up by a third core the base material sheet and the first porous sheet to be overlapped with each other, and processing the base material sheet by a first processing liquid held in the first porous sheet; and winding out the base material sheet and the first porous sheet overlappingly wound up by the third core, winding up the first porous sheet by the second core, and winding up the base material sheet by the first core.

15 Claims, 5 Drawing Sheets

(51) Int. Cl.
*B05D 1/28* (2006.01)
*C08J 5/22* (2006.01)
*C08J 7/16* (2006.01)
*C08F 2/00* (2006.01)
*B01J 19/00* (2006.01)
*B01J 41/07* (2017.01)
*B01J 41/14* (2006.01)
*B32B 27/06* (2006.01)
*B32B 37/20* (2006.01)
*C08F 259/04* (2006.01)
*C08F 259/08* (2006.01)
*C08F 261/04* (2006.01)

(52) U.S. Cl.
CPC ............... *B05D 1/28* (2013.01); *B32B 27/06* (2013.01); *B32B 37/203* (2013.01); *C08F 2/00* (2013.01); *C08F 255/02* (2013.01); *C08F 259/04* (2013.01); *C08F 259/08* (2013.01); *C08F 261/04* (2013.01); *C08J 5/22* (2013.01); *C08J 5/225* (2013.01); *C08J 5/2243* (2013.01); *C08J 7/16* (2013.01); *B32B 2305/026* (2013.01)

(58) Field of Classification Search
CPC ...... C08F 261/04; C08F 5/225; C08F 5/2243; B32B 37/203; B32B 27/06

USPC .......................................................... 428/220
See application file for complete search history.

(56) References Cited

FOREIGN PATENT DOCUMENTS

| | | |
|---|---|---|
| JP | 2001-152370 | 6/2001 |
| JP | 2005-60555 | 3/2005 |
| JP | 2005-60894 | 3/2005 |
| WO | WO 02/066549 A1 | 8/2002 |
| WO | WO 2011/111558 A1 | 9/2011 |

OTHER PUBLICATIONS

International Search Report dated Nov. 7, 2017 in PCT/JP2017/029021, filed on Aug. 9, 2017 (with English Translation).
Written Opinion dated Nov. 7, 2017 in PCT/JP2017/029021, filed on Aug. 9, 2017.
Takashi Miyazaki, "Development of a New Continuous Processing Technology for the Textiles through the Electron Beam Induced Graft Polymerization" (with partial translation), Japanese Society of Textile Research p. 91, p. 303 (2005).

* cited by examiner

PROCESSING METHOD OF BASE MATERIAL SHEET, MANUFACTURING METHOD OF MODIFIED BASE MATERIAL SHEET, BASE MATERIAL WITH GRAFTED POLYMER CHAIN, AND ION EXCHANGE MEMBRANE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2017/029021 filed on Aug. 9, 2017 and designating the U.S., which claims priority of Japanese Patent Application No. 2016-157874 filed on Aug. 10, 2016. The entire contents of the foregoing applications are incorporated herein by reference.

BACKGROUND OF THE INVENTION

1. Field of the Invention

The disclosure herein generally relates to a processing method of a base material sheet, and a manufacturing method of a modified base material sheet.

2. Description of the Related Art

Japanese Unexamined Patent Application Publication No. 2000-053788 discloses a radiation graft polymerization method in which a base material irradiated with a radiation is overlapped with a support material, and is impregnated with a monomer liquid, and thereby at least the monomer liquid is held in the support material, and a monomer is supplied from the support material to the base material. The base material and the support material are attached to separate feed rolls, fed from the feed rolls at a constant speed, overlapped with each other after being fed from the feeding rolls, and immersed in the monomer liquid in an impregnation bath. The base material and the support material pulled from the monomer liquid are wound up together by a winding roll.

SUMMARY OF THE INVENTION

Technical Problem

A method is studied in which a base material sheet wound up by a first core and a porous material sheet, as the support material, wound up by a second core are wound out, overlapped with each other and wound up by a third core, and thereby the base material sheet is processed by a processing liquid held in the porous sheet.

Because in the aforementioned processing method of a base material sheet, a roll-to-roll technique is used, the base material sheet can be processed continuously and in large quantities. Moreover, because the porous sheet functions as a holding layer for holding the processing liquid, a nonuniformity of processing can be reduced and a utilization efficiency of the processing liquid can be enhanced, and a use amount of the processing liquid can be reduced.

However, as the processing of the base material sheet is gradually advanced, a dimension of the base material sheet may gradually change. In a state where the base material sheet is wound up by the third core, when the base material sheet expands or the base material sheet contracts, a distortion, folds or wrinkles may be generated.

The present invention was made in view of such a problem, and it is a main object to provide a processing method of a base material sheet in which a defect due to a change in a dimension of the base material sheet can be prevented from occurring.

Solution to Problem

In order to solve the aforementioned problem, according to an aspect of the present invention, a processing method of a base material sheet including
 winding out the base material sheet wound up by a first core and a first porous sheet wound up by a second core,
 winding up by a third core the base material sheet and the first porous sheet to be overlapped with each other, and
 processing the base material sheet by a first processing liquid held in the first porous sheet; and
 winding out the base material sheet and the first porous sheet overlappingly wound up by the third core,
 winding up the first porous sheet by the second core, and winding up the base material sheet by the first core, is provided.

Effect of Invention

According to an aspect of the present invention, a processing method of a base material sheet, in which a defect due to a change in a dimension of the base material sheet can be prevented from occurring, is provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

Figure 1:
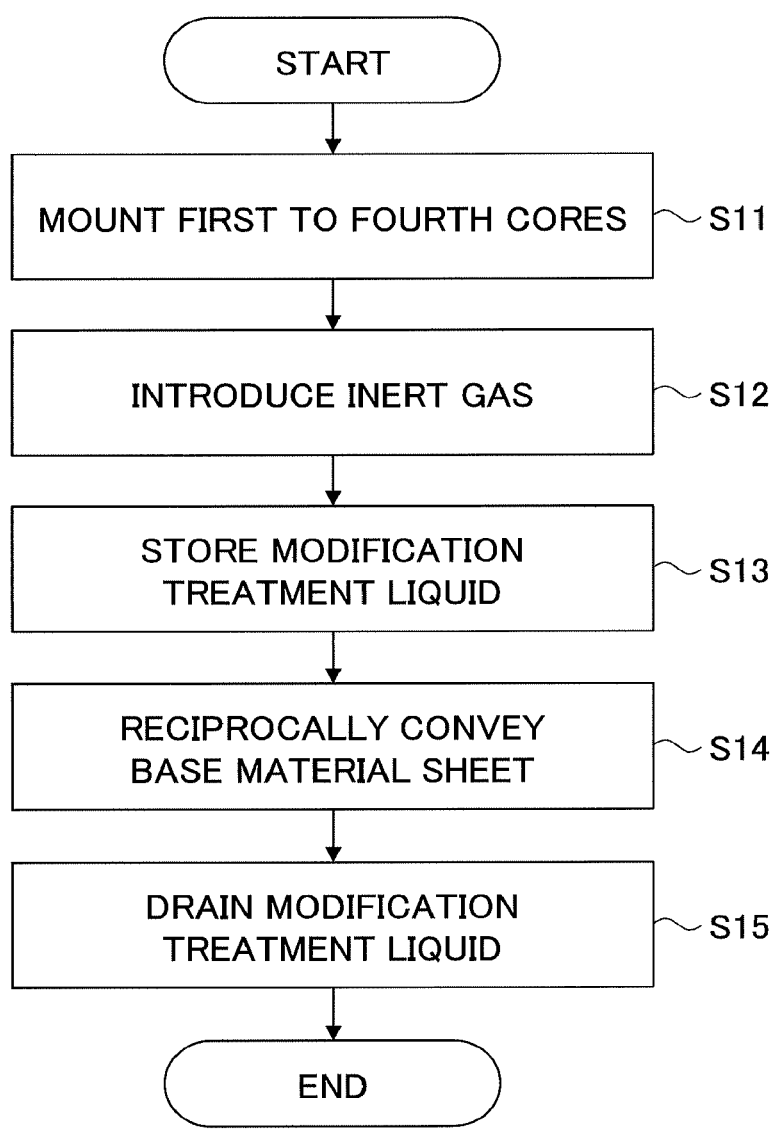
FIG. 1 is a flowchart schematically depicting a processing method of a base material sheet according to an embodiment.

In the following, with reference to drawings, embodiments of the present invention will be described. In each drawing, the same or corresponding reference numeral is assigned to the same or corresponding component, and redundant explanation will be omitted.

[Processing Method of Base Material Sheet]

FIG. 1 is a flowchart schematically depicting a processing method of a base material sheet according to an embodiment. Note that the processing method of a base material sheet is not limited to the method shown in FIG. 1. For example, the processing method of a base material sheet may include only a part of a plurality of steps illustrated in FIG. 1. Moreover, the order of the plurality of steps illustrated in FIG. 1 is not particularly limited.

Figure 2:
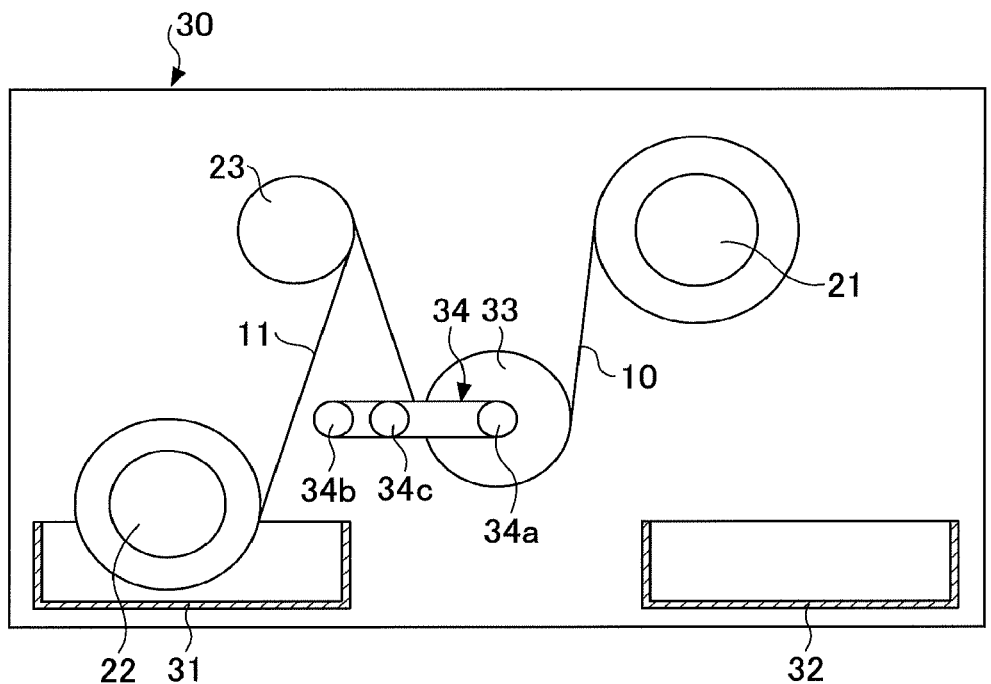
FIG. 2 is a diagram schematically depicting a processing device according to the embodiment in a state in which an installation of a first core, a second core and a third core is completed.
Figure 3:
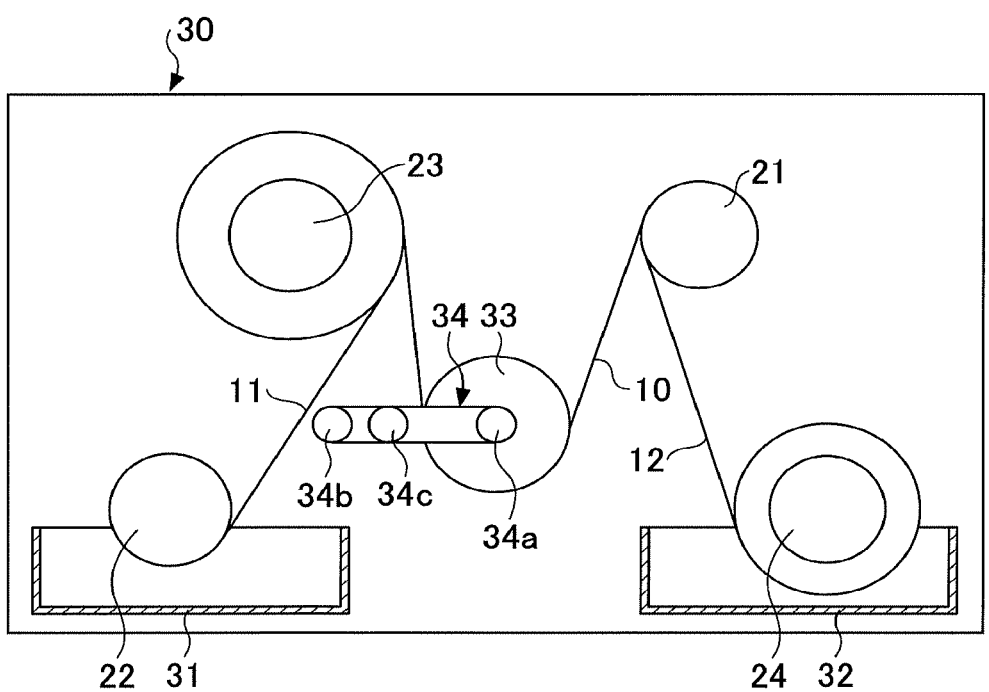
FIG. 3 is a diagram schematically depicting the processing device according to the embodiment in a state subsequent to the state illustrated in FIG. 2, in which an installation of a fourth core is completed.

First, a first core 21, a second core 22, a third core 23, and a fourth core 24 are installed in a processing device 30 (step S11 in FIG. 1). Processing at step S11 will be described with reference to FIGS. 2 and 3. In FIGS. 2 and 3, a first storage tank 31 and a second storage tank 32 are shown in a cutaway state. The same applies to FIGS. 4 and 6.

FIG. 2 is a diagram schematically depicting the processing device 30 in a state where the installation of the first core 21, a second core 22 and the third core 23 is completed according to the embodiment.

The first core 21 is detachable from the processing device 30, and has already wound up the base material sheet 10 before the installation in the processing device 30. After the installation of the first core 21, an end portion 10a of the base material sheet 10 in the longitudinal direction is connected to the third core 23.

The base material sheet 10 is a dense material in the embodiment; the base material sheet 10 may be a porous material. For a porous sheet, for example, a net, a woven cloth, or an unwoven cloth may be used. A material of the base material sheet 10 is appropriately selected according to the processing of the base material sheet 10.

The second core 22 is detachable from the processing device 30, and has already wound up a first porous sheet 11 before the installation in the processing device 30. After the installation of the second core 22, an end portion of the first porous sheet 11 in the longitudinal direction is connected to the third core 23.

Figure 4:
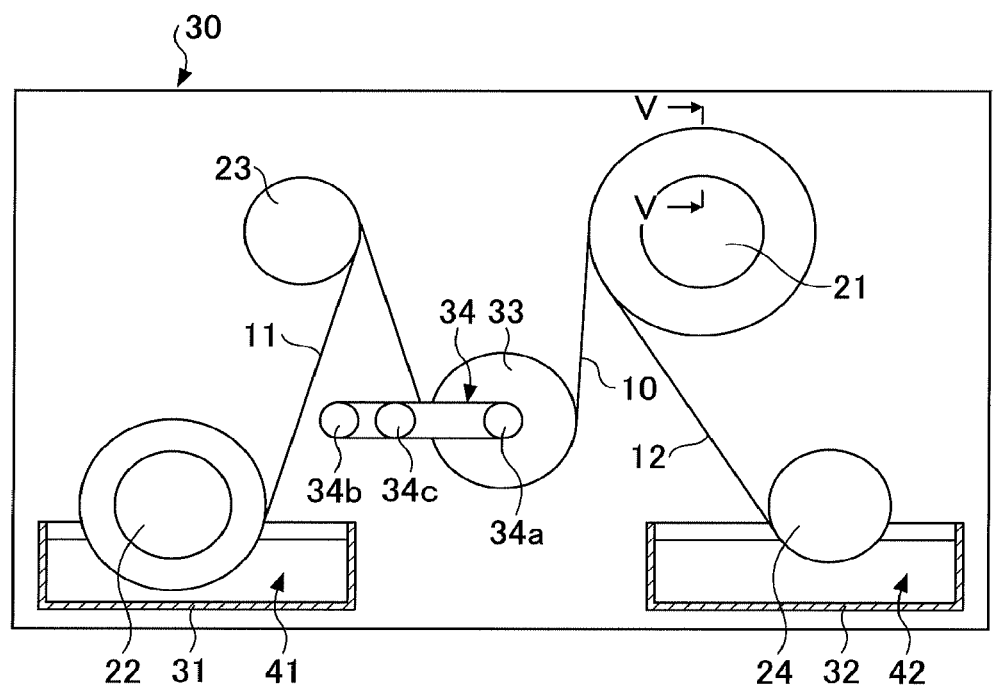
FIG. 4 is a diagram schematically depicting the processing device according to the embodiment in a state subsequent to the state illustrated in FIG. 3, in which winding up of the base material sheet by the first core is completed.
Figure 6:
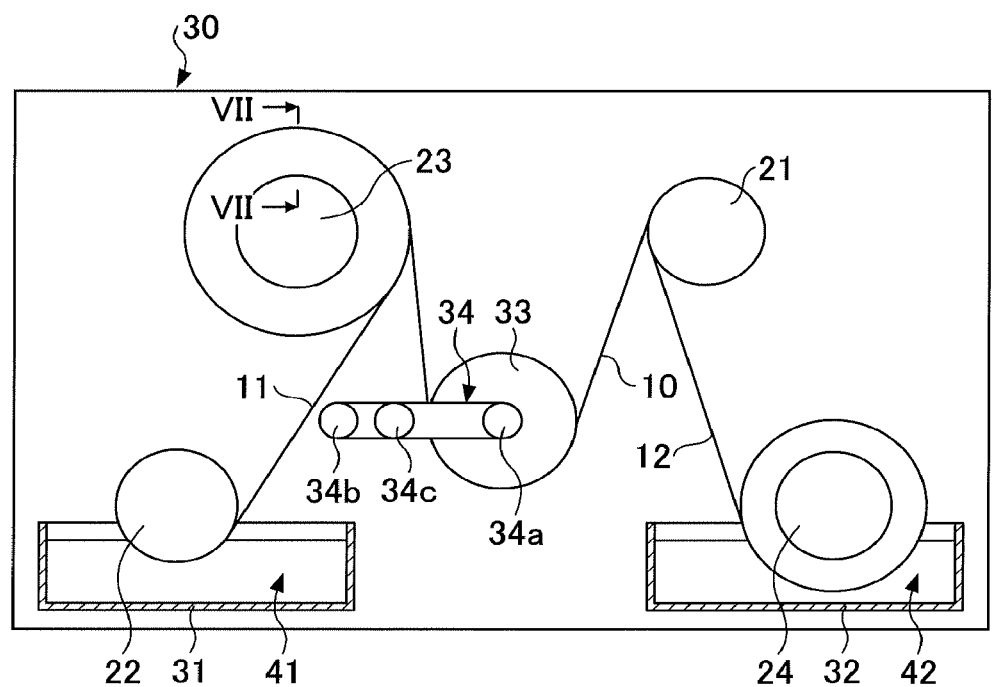
FIG. 6 is a diagram schematically depicting the processing device according to the embodiment, in a state subsequent to the state illustrated in FIG. 4, in which a winding up of the base material sheet by the third core is completed.

The first porous sheet 11 holds a first processing liquid 41 (See FIGS. 4 and 6). For the first porous sheet 11, for example, a net, a woven cloth, or an unwoven cloth may be used. A material of the first porous sheet 11 may be the same as the material of the base material sheet 10, or may be different from the material of the base material sheet 10. The material of the first porous sheet 11 is appropriately selected according to the processing of the first porous sheet 11.

Afterwards, the processing device 30 winds out the base material sheet 10 wound up by the first core 21 and the first porous sheet 11 wound up by the second core 22, and winds up by the third core 23 the base material sheet 10 and the first porous sheet 11 to be overlapped with each other, as illustrated in FIG. 3.

FIG. 3 is a diagram schematically depicting the processing device 30 in a state subsequent to the state illustrated in FIG. 2, in which the installation of the fourth core is completed.

The fourth core 24 is detachable from the processing device 30, and has already wound up a second porous sheet 12 before the installation in the processing device 30. After the installation of the fourth core 24, an end portion of the second porous sheet 12 in the longitudinal direction is connected to the first core 21.

The second porous sheet 12 holds a second processing liquid 42 (See FIGS. 4 and 6). For the second porous sheet 12, the same material as the first porous sheet 11 is used.

In the process at step S12, shown in FIG. 1, an inert gas, such as a nitrogen gas, is continuously introduced into the inside the processing device 30, to eject an air inside the processing device 30 to the outside. Thus, the inert gas is filled inside the processing device 30.

Afterwards, the processing device 30 winds out the base material sheet 10 wound up by the third core 23 and the second porous sheet 12 wound up by the fourth core 24, and winds up by the first core 21 the base material sheet 10 and the second porous sheet 12 to be overlapped with each other, as illustrated in FIG. 4.

In the process at step S13, shown in FIG. 1, a modification processing liquid is reserved as a first processing liquid 41 and a second processing liquid 42. The modification processing liquid modifies a property of the base material sheet 10. The modifying means enhancing a composition and/or property of the material of the base material sheet 10. The process at step S13 will be described with reference to FIG. 4.

FIG. 4 is a diagram schematically depicting the processing device 30 in a state subsequent to the state illustrated in FIG. 3, in which winding up of the base material sheet 10 by the first core 21 is completed. Note that in the embodiment a modification processing liquid is reserved in the state illustrated in FIG. 4, but may be reserved in a state illustrated in FIG. 6.

The processing device 30 reserves the first processing liquid 41 inside the first storage tank 31 installed immediately below the second core 22. A lower part of a roll of the first porous sheet 11 wound up by the second core 22 is immersed in the first processing liquid 41. Note that at least a part of the roll of the first porous sheet 11 is required to be immersed in the first processing liquid 41. Thus, the entire roll of the first porous sheet 11 may be immersed in the first processing liquid 41.

The first storage tank 31 is connected to a supply tube that supplies the first processing liquid 41 to the first storage tank 31, and a discharge tube that discharges the first processing liquid 41 from the first storage tank 31. For the first processing liquid 41, a plurality of kinds of processing liquids may be prepared, or may be selectively used depending on the situation.

Moreover, the processing device 30 reserves the second processing liquid 42 inside the second storage tank 32 installed immediately below the fourth core 24. A lower part of a roll of the second porous sheet 12 wound up by the fourth core 24 is immersed in the second processing liquid 42. Note that at least a part of the roll of the second porous sheet 12 is required to be immersed in the second processing liquid 42. Thus, the entire roll of the second porous sheet 12 may be immersed in the second processing liquid 42.

The second storage tank 32 is connected to a supply tube that supplies the second processing liquid 42 to the second storage tank 32, and a discharge tube that discharges the second processing liquid 42 from the second storage tank 32. For the second processing liquid 42 plural kinds of processing liquids may be prepared, or may be selectively used depending on the situation.

In the embodiment, the first processing liquid 41 and the second processing liquid 42 perform the same processing for the same base material sheet 10, but may perform different processing for the same base material sheet 10. In the case where the second processing liquid 42 is the same as the first processing liquid 41, the second storage tank 32 and the first storage tank 31 may be integrated.

The first processing liquid 41 and the second processing liquid 42 may be a modification processing liquid that modifies the property of the base material sheet 10. The modification processing liquid includes, a liquid that graft polymerizes monomers with the base material sheet 10 (a liquid including monomers), a liquid that introduces ion exchange groups into the base material sheet 10 (a liquid including a sulfonating agent, a liquid including amination agent, or the like), or the like.

The base material sheet 10 changes the dimension thereof due to the modification. However, the first porous sheet 11 and the second porous sheet 12 are not subjected to the modification, and the dimensions thereof are almost unchanged. Thus, the dimensional change rate of the first porous sheet 11 is less than the dimensional change rate of the base material sheet 10.

Note that the first processing liquid 41 or the second processing liquid 42 according to the embodiment is a modification processing liquid, but may be a cleaning processing liquid or the like. For the cleaning processing liquid, an organic solvent based processing liquid represented by xylene, acetone, and alcohols may be used, or an aqueous processing liquid may be used. The cleaning processing liquid is appropriately selected according to the modification processing liquid. The cleaning processing liquid cleans the first porous sheet 11, the second porous sheet 12 or the base material sheet 10. After the first cleaning, further cleaning may be performed. In the second cleaning, a cleaning processing liquid of the same type may be used, or a cleaning processing liquid of different type may be used. By performing a plurality of cleanings, the modification processing liquid adhering to or impregnated in the first porous sheet 11, the second porous sheet 12, the base material sheet 10, or the like, is further cleaned.

Figure 5:
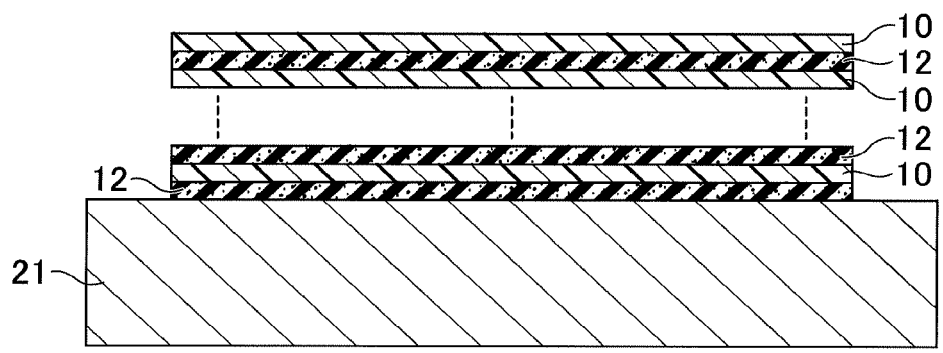
FIG. 5 is a cross-sectional view schematically depicting a cross section of the processing device, cut along a line V-V in FIG. 4.
Figure 7:
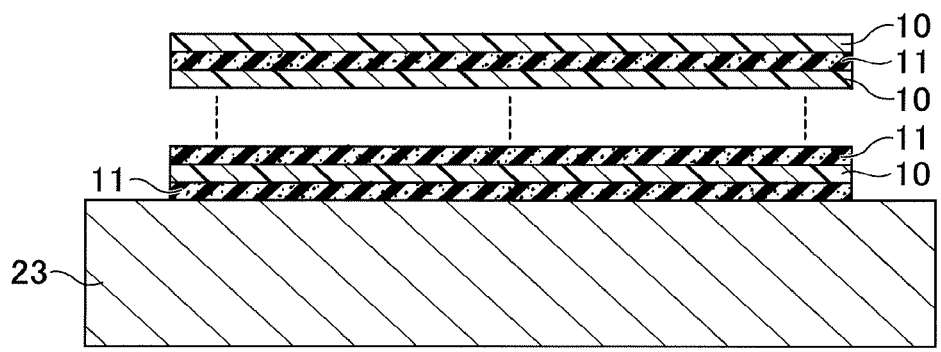
FIG. 7 is a cross-sectional view schematically depicting a cross section of the processing device, cut along a line VII-VII in FIG. 6.

In step S14 shown in FIG. 1, the base material sheet 10 is reciprocally conveyed. The process at step S14 will be described with reference to FIGS. 5 to 7 and the like, in addition to FIG. 4. FIG. 5 is a cross-sectional view schematically depicting a cross section of the processing device, cut along a line V-V indicated in FIG. 4. FIG. 6 is a diagram schematically depicting the processing device, in a state subsequent to the state illustrated in FIG. 4, in which a winding up of the base material sheet by the third core in completed. FIG. 7 is a cross-sectional view schematically depicting a cross section of the processing device, cut along a line VII-VII indicated in FIG. 6.

The processing device 30 transfers the state of the processing device 30 from the state illustrated in FIG. 4 and FIG. 5, to the state illustrated in FIG. 6 and FIG. 7. Specifically, the processing device 30 winds out the base material sheet 10 wound up by the first core 21, and the first porous sheet 11 wound up by the second core 22, and winds up by the third core 23 the base material sheet 10 and the first porous sheet 11 to be overlapped with each other.

The base material sheet 10 and the first porous sheet 11 wound up by the third core 23 are alternately laminated, as illustrated in FIG. 7. Thus, the base material sheet 10 can be processed by the first processing liquid 41 held in the first porous sheet 11.

Because in the aforementioned processing method, a roll-to-roll technique is used, the base material sheet 10 can be processed continuously and in large quantities. Moreover, because the first porous sheet 11 functions as a holding layer for holding the first processing liquid 41, a nonuniformity of processing can be reduced, and a utilization efficiency of the first processing liquid 41 can be enhanced, and a use amount of the first processing liquid 41 can be reduced.

As the processing of the base material sheet 10 by the first processing liquid 41 is gradually advanced, a dimension of the base material sheet 10 gradually changes.

Then, in order to control a defect due to a change in the dimension of the base material sheet 10 (e.g. a distortion, folds or wrinkles), the processing device 30 transfers the state of the processing device 30 from the state illustrated in FIG. 6 and FIG. 7 to the state illustrated in FIG. 4 and FIG. 5. Specifically, the processing device 30 winds out the base material sheet 10 and the first porous sheet 11 overlappingly wound up by the third core 23, and winds up the first porous sheet 11 by the second core 22 and the base material sheet 10 by the first core 21. Because the base material sheet 10 has a dimensional change rate different from a dimensional change rate of the first porous sheet 11, the base material sheet 10 is wound up by a core that is different from the core for the first porous sheet 11.

At this time, the processing device 30 winds out the second porous sheet 12 wound up by the fourth core 24, and winds up the second porous sheet 12 and the base material sheet 10 by the first core 21, to be overlapped with each other, as illustrated in FIG. 4 or FIG. 5. According to a surface irregularity of the second porous sheet 12, the base material sheet 10 can be prevented from sliding when the base material sheet 10 is wound up. Moreover, the base material sheet 10 can be processed by the second processing liquid 42 held in the second porous sheet 12.

Because in the aforementioned processing method, a roll-to-roll technique is used, the base material sheet 10 can be processed continuously and in large quantities. Moreover, because the second porous sheet 12 functions as a holding layer for holding the second processing liquid 42, a nonuniformity of processing can be reduced, and a utilization efficiency of the second processing liquid 42 can be enhanced, and a use amount of the second processing liquid 42 can be reduced.

As the processing of the base material sheet 10 by the second processing liquid 42 is gradually advanced, a dimension of the base material sheet 10 gradually changes.

Then, in order to control a defect due to a change in the dimension of the base material sheet 10, the processing device 30 further transfers the state of the processing device 30 from the state illustrated in FIG. 4 and FIG. 5 to the state illustrated in FIG. 6 and FIG. 7. Specifically, the processing device 30 winds out the base material sheet 10 and the second porous sheet 12 overlappingly wound up by the first core 21, and winds up the second porous sheet 12 by the fourth core 24 and the base material sheet 10 by the third core 23. Because the base material sheet 10 has the dimensional change rate different from a dimensional change rate of the second porous sheet 12, the base material sheet 10 is wound up by a core that is different from the core for the second porous sheet 12.

At this time, the processing device 30 winds out the first porous sheet 11 wound up by the second core 22, and winds up the first porous sheet 11 and the base material sheet 10 by the third core 23, to be overlapped with each other, as illustrated in FIG. 6 or FIG. 7. According to a surface irregularity of the first porous sheet 11, the base material sheet 10 can be prevented from sliding when the base material sheet 10 is wound up. Moreover, the base material sheet 10 can be processed by the first processing liquid 41 held in the first porous sheet 11. As the processing of the base material sheet 10 is gradually advanced, the dimension of the base material sheet 10 gradually changes.

Afterwards, the processing device 30 may transfer the state of the processing device 30 repeatedly between the state illustrated in FIG. 6 and the state illustrated in FIG. 4.

In this way, the processing device 30 may repeat a plurality of times the process of winding out the base material sheet 10 wound up by the first core 21, winding up the base material sheet 10 by the third core 23, winding out the base material sheet 10, and winding up again the base material sheet 10 by the first core 21. According to the aforementioned processes, the process for the base material sheet 10 is advanced, and a defect due to a change in the dimension of the base material sheet 10 can be prevented from occurring.

During a period from the first porous sheet 11 being wound out from the third core 23 until the first porous sheet 11 is wound up by the third core 23 again, the first processing liquid 41 may be replenished to the first porous sheet 11 in the processing device 30. Thus, a concentration of an active ingredient of the first processing liquid 41 contained in the first porous sheet 11 can be recovered, and the process for the base material sheet 10 can be accelerated.

The processing device 30 may supply (or replenish) the first processing liquid 41 to the first porous sheet 11 at a position where the first porous sheet 11 is separated from the base material sheet 10. The first processing liquid 41 can be supplied to the base material sheet 10 only via the first porous sheet 11.

Note that in the embodiment, the first processing liquid 41 is stored inside the first storage tank 31 installed immediately below the second core 22. However, a position of supplying the first processing liquid 41 and a method of supplying the first processing liquid 41 are not particularly limited. For example, the first storage tank 31 may be installed in the middle of the conveying path of the first porous sheet 11 (conveying path between the second core 22 and the third core 23). Moreover, instead of the first storage tank 31 for storing the first processing liquid 41, a spray for spraying the first processing liquid 41 may be used.

Moreover, the processing device 30 may repeat a plurality of times the process of winding out the base material sheet 10 wound up by the third core 23, winding up the base material sheet 10 by the first core 21, winding out the base material sheet 10, and winding up again the base material sheet 10 by the third core 23. According to the aforementioned processes, the process for the base material sheet 10 is advanced, and a defect due to a change in the dimension of the base material sheet 10 can be prevented from occurring.

During a period from the second porous sheet 12 being wound out from the first core 21 until the second porous sheet 12 is wound up by the first core 21 again, the second processing liquid 42 may be replenished to the second porous sheet 12. Thus, a concentration of an active ingredient of the second processing liquid 42 contained in the second porous sheet 12 can be recovered, and the process for the base material sheet 10 can be accelerated.

The processing device 30 may supply (or replenish) the second processing liquid 42 to the second porous sheet 12 at a position where the second porous sheet 12 is separated from the base material sheet 10. The second processing liquid 42 can be supplied to the base material sheet 10 only via the second porous sheet 12.

Note that in the embodiment, the second processing liquid 42 is stored inside the second storage tank 32 installed immediately below the fourth core 24. However, a position of supplying the second processing liquid 42 and a method of supplying the second processing liquid 42 are not particularly limited. For example, the second storage tank 32 may be installed in the middle of the conveying path of the second porous sheet 12 (conveying path between the fourth core 24 and the first core 21). Moreover, instead of the second storage tank 32 for storing the second processing liquid 42, a spray for spraying the second processing liquid 42 may be used.

The processing device 30 may apply a tensile force to the base material sheet 10 in the width direction by causing the base material sheet 10, separated from the first porous sheet 11 and the second porous sheet 12, to be curved along an expander roll 33, between the third core 23 and the first core 21. According to the aforementioned process, a distortion, folds or wrinkles in the base material sheet can be reduced. Because the base material sheet 10 has a dimensional change rate different from the dimensional change rate of the first porous sheet 11 and from the dimensional change rate of the second porous sheet 12, in the embodiment, the base material sheet 10 is caused to be curved along the expander roll 33 alone.

Note that in the embodiment, when the property of the base material sheet 10 is modified, properties of the first porous sheet 11 and the second porous sheet 12 are not modified. However, the properties of the first porous sheet 11 and the second porous sheet 12 may be modified. In this case, the first porous sheet 11 and the second porous sheet 12 change in dimensions.

Then, between the third core 23 and the second core 22, a tensile force may be applied to the first porous sheet 11 in the width direction, by causing the first porous sheet 11, separated from the base material sheet 10, to be curved along an expander roll.

Similarly, between the first core 21 and the fourth core 24, a tensile force may be applied to the second porous sheet 12 in the width direction, by making the second porous sheet 12, separated from the base material sheet 10, be curved along the expander roll.

The expander roll 33 may be configured of a typical material. For example, the expander roll 33 may be a flat expander roll. The flat expander roll has a plurality of rubber straps in parallel to a rotational center line and around the rotational center line at intervals. Each of the plurality of rubber straps expands and contracts independently with a rotation of the roll. Each rubber strap gradually expands when the rubber strap contacts the base material sheet 10, and the rubber strap contracts when the rubber strap is separated from the base material sheet 10. Note that the flat expander roll can be used for a meandering correction for the base material sheet 10.

The expander roll 33 may have a role of a dancer roll for controlling a tensile force applied to the base material sheet 10 in the longitudinal direction. Note that a dancer roll may be arranged separately from the expander roll 33.

A dancer arm 34 has one end portion 34a, to which a dancer roll is attached, and the other end portion 34b, to which a counter balance is attached. The dancer arm 34 is rockable around a fulcrum 34c arranged between the end portions 34a and 34b. Rotational speed of the first core 21 and the third core 23 are controlled so that the dancer roll stays at a constant position, and thereby the tensile force applied to the base material sheet 10 in the longitudinal direction can be controlled to be constant. The position of the dancer roll can be detected, for example, by a displacement sensor 35 (See FIG. 8).

The processing device 30 may perform control so that a tensile force T1 applied to the base material sheet 10 in the longitudinal direction between the third core 23 and the first core 21 is less than a tensile force T2 applied to the first porous sheet 11 in the longitudinal direction between the third core 23 and the second core 22. Moreover, the processing device 30 may perform control so that the tensile force T1 applied to the base material sheet 10 in the longitudinal direction between the third core 23 and the first core 21 is less than a tensile force T3 applied to the second porous sheet 12 in the longitudinal direction between the fourth core 24 and the first core 21. According to the aforementioned process, the base material sheet 10 can be prevented from unintentionally deforming.

Figure 8:
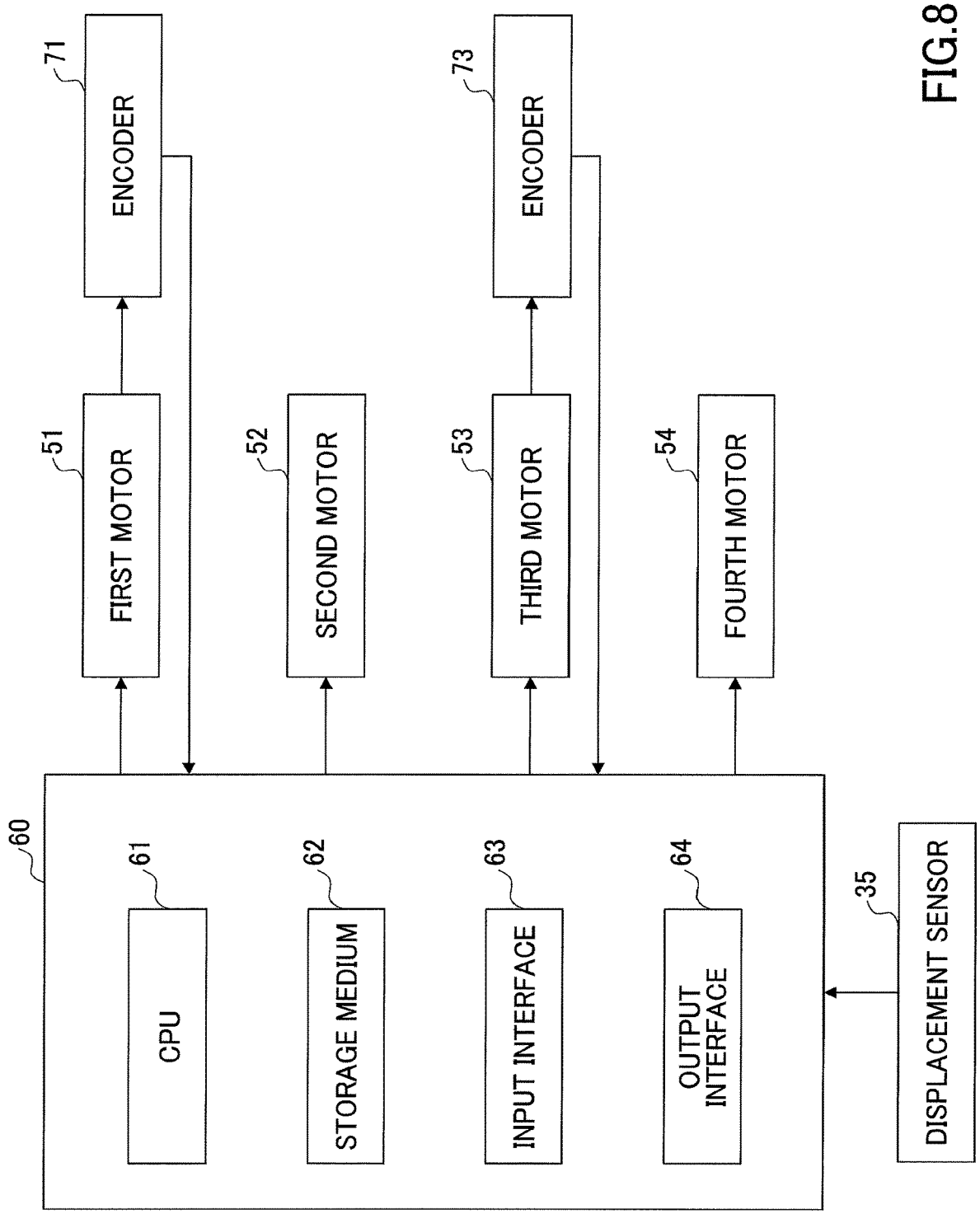
FIG. 8 is a block diagram schematically depicting an example of a configuration of a processing device according to the embodiment.

FIG. 8 is a block diagram schematically depicting a configuration of the processing device 30 according to the embodiment. The processing device 30 includes a first motor 51, a second motor 52, a third motor 53, and a fourth motor 54. The first motor 51 rotates the first core 21, the second motor 52 rotates the second core 22, the third motor 53 rotates the third core 23, and the fourth motor 54 rotates the fourth core 24. Moreover, the processing device 30 includes a controller 60 that controls the first motor 51, the second motor 52, the third motor 53, and the fourth motor 54.

The controller 60 includes a CPU (Central Processing Unit) 61, a storage medium 62 such as a memory, an input interface 63, and an output interface 64. The controller 60 performs a variety of controls by causing the CPU 61 to execute a program stored in the storage medium 62. Moreover, the controller 60 receives a signal from outside by the input interface 63, and transmits a signal to the outside by the output interface 64.

The controller 60 controls the first motor 51, the second motor 52, the third motor 53, and the fourth motor 54 based on a result of detection by various detectors such as the displacement sensor 35. The detectors include, in addition to the displacement sensor 35, for example, an encoder 71 that detects a rotation speed of the first motor 51 and an encoder 73 that detects a rotation speed of the third motor 53.

For example, the controller 60 controls the first motor 51 and the third motor 53 based on the result of detection by the encoders 71 and 73 and the displacement sensor 35, thereby controlling the tensile force T1 applied to the base material sheet 10 in the longitudinal direction.

Moreover, the controller 60 calculates an outer diameter of a roll wound up by the third core 23 based on a thickness of the base material sheet 10, a thickness of the first porous sheet 11, and a rotation amount of the third core 23, controls the second motor 52 based on the outer diameter and a target tensile force, and thereby controls the tensile force T2 applied to the first porous sheet 11 in the longitudinal direction.

Moreover, the controller 60 calculates an outer diameter of a roll wound up by the first core 21 based on the thickness of the base material sheet 10, a thickness of the second porous sheet 12, and a rotation amount of the first core 21, controls the fourth motor 54 based on the outer diameter and a target tensile force, and thereby controls the tensile force T3 applied to the second porous sheet 12 in the longitudinal direction.

A conveyance speed of the base material sheet 10 and a stop time in the state illustrated in FIG. 6 are set so that an elapsed time, from the end portion of both ends of the base material sheet 10 that is closer to the third core 23 being wound up by the third core 23 until being wound out from the third core 23, does not exceed an upper limit. According to the aforementioned process, a maximum dimensional change rate of the base material sheet 10, from the base material sheet 10 being wound up by the third core 23 until the base material sheet is wound out from the third core 23, can be suppressed within an allowable range. Note that the stop time in the state illustrated in FIG. 6 may be zero.

Similarly, a conveyance speed of the base material sheet 10 and a stop time in the state illustrated in FIG. 4 are set so that an elapsed time, from the end portion of both ends of the base material sheet 10 that is closer to the first core 21 being wound up by the first core 21 until being wound out from the first core 21, does not exceed an upper limit. According to the aforementioned process, a maximum dimensional change rate of the base material sheet 10, from the base material sheet 10 being wound up by the first core 21 until the base material sheet is wound out from the first core 21, can be suppressed within an allowable range. Note that the stop time in the state illustrated in FIG. 4 may be zero.

A relation between the dimensional change rate of the base material sheet 10 and the elapsed time can be experimentally obtained in advance, for example. In the experiment, for example, a sheet, configured of the same material and having the same thickness as the base material sheet 10, and having a square shape with 100 mm of each side, is immersed in the first processing liquid 41 or the second processing liquid 42. The sheet is extracted every predetermined time, and a dimension of the sheet is measured.

The maximum dimensional change rate of the base material sheet 10 from being wound up by the first core 21 or the third core 23 until being wound out from the first core 21 or the third core falls within a range of, for example, $-1.0\%$ to $1.0\%$, and preferably a range of $-0.3\%$ to $0.3\%$. Based on the allowable range, the upper limit of the elapsed time is set.

The processing device 30 may end the process for the base material sheet 10 in any state of the state illustrated in FIG. 4 and the state illustrated in FIG. 6.

At step S15, shown in FIG. 1, a liquid draining for the modification processing liquid as the first processing liquid 41 or the second processing liquid 42 is performed. According to the process, the state of the processing device 30 returns to the state illustrated in FIG. 2 or the state illustrated in FIG. 3.

Afterwards, the base material sheet 10 is wound up by the first core 21 or the third core 23, separately from the first porous sheet 11 and the second porous sheet 12, and carried out to the outside of the processing device 30. Thus, the modified based material sheet obtained by modifying the base material sheet 10 is prepared.

Note that, in the embodiment, the base material sheet 10 is carried out to the outside of the processing device 30 separately from the first porous sheet 11 and the second porous sheet 12. However, the base material sheet 10 may be wound up with the first porous sheet 11 or the second porous sheet 12 and carried out to the outside of the processing device 30.

[Manufacturing Method of Modified Base Material Sheet]

The processing method of a base material sheet according to the aforementioned embodiment may be used for modifying the property of the base material sheet 10, e.g. used for at least one of following step (1) and following step (2).

Step (1) is a step of graft polymerizing monomers with the base material sheet 10. For the base material sheet 10, a material that includes, for example, a polyolefin, such as polyethylene, or polypropylene, halogenated polyolefins, such as polyvinyl chloride, polytetrafluoroethylene (PTFE), or vinyl chloride, or an olefin-halogenated olefin copolymer, such as ethylene-tetrafluoroethylene copolymer, or ethylene-vinyl alcohol copolymer (EVA), and that produces radicals by irradiating with radioactive rays (α, β, γ, electrons, ultraviolet rays or the like) may be used. For the first processing liquid 41 and the second processing liquid 42, for example, a monomer liquid including a monomer such as styrene, and a solvent such as xylene, is used. The solvent includes, for example, a hydrocarbon (benzene, xylene, toluene, hexane or the like), an alcohol (methanol, ethanol, isopropyl alcohol or the like), a ketone (acetone, methyl isopropyl ketone, cyclohexane, or the like), an ether (dioxane, tetrahydrofuran, or the like), an ester (ethylacetate, butylacetate, or the like), a nitrogen-containing compound (isopropylamine, diethanolamine, N-methylformamide, N,N-dimethylformamide, or the like), or the like. According to the aforementioned step (1), a base material with grafted polymer chain can be obtained. The "grafted polymer chain" means a chain including a block or several blocks connected to a main chain composing a polymer that configures the base material, and having a feature on structure or arrangement different from the main chain.

Step (2) is a step of introducing an ion-exchange group into the base material sheet 10. For the base material sheet 10, a base material sheet, with which monomers having groups that can be converted into ion-exchange groups are graft polymerized, may be used. The monomer having the groups that can be converted into ion-exchange groups includes acrylonitrile, acrolein, vinylpyridine, styrene, chloromethyl styrene, glycidyl methacrylate, or the like. The monomers having the groups that can be converted into ion-exchange groups are introduced into the base material sheet 10 by graft polymerization, and then a sulfonating agent is caused to react with the base material sheet 10 to introduce sulfone groups into the base material sheet 10, or an amination agent is caused to react with the base material sheet 10 to introduce amino groups, and thereby ion-exchange groups can be obtained. For the first processing liquid 41 and the second processing liquid 42, for example, a sulfonating agent such as sodium sulfite, or concentrated sulfuric acid, or an amination agent such as diethanolamine, or trimethylamine is used. According to the aforementioned step (2), an ion-exchange membrane can be obtained. The ion-exchange membrane may be any of a cation exchange membrane and an anion exchange membrane.

Note that in the aforementioned step (1), instead of the monomers having groups that can be converted into ion-exchange groups, monomers having ion-exchange groups may be graft polymerized with the base material sheet 10. In this case, according to the aforementioned step (1), an ion-exchange membrane can be obtained. The monomers having ion exchange groups include acrylic acid, methacrylic acid/acrylic acid, methacrylic acid, sodium styrenesulfonate, sodium methallylsulfonate, sodium allylsulfonate, vinylbenzyltrimethylammoniumchloride, 2-hydroxyethylmethacrylate, dimethylacrylamide, or the like. The ion-exchange membrane obtained by the aforementioned step (2) has a base material with grafted polymer chain.

In the case of applying the processing method of a base material sheet according to the embodiment to at least one of the aforementioned step (1) and the step (2), an excessively thin base material sheet 10 makes conveyance of the base material sheet 10 difficult, and an excessively thick base material sheet 10 makes a winding up of the base material sheet 10 difficult. Thus, the thickness of the base material sheet 10 preferably falls within a region from 20 μm to 1000 μm, more preferably falls within a region from 25 μm to 500 μm, and especially preferably falls within a region from 30 μm to 200 μm.

Typically, when the graft polymerization proceeds, the dimension of the base material sheet gradually increases. Thus, in the case of processing a large-area base material sheet at a time, in a method of immersing the base material sheet in a modification processing liquid or the like, the modification processing liquid may not contact the large-area base material sheet homogeneously, and it is difficult to retain homogeneity within a surface of the base material sheet. For example, in the method disclosed in Japanese Unexamined Patent Application Publication No. 2000-053788, a dimension of the porous sheet that supports the base material sheet does not change, with respect to the change in the dimension of the base material sheet. Thus, in the base material sheet, a distortion, folds or wrinkles may be generated, and it is difficult to retain homogeneity of contacting the modification processing liquid.

According to the method of the embodiment, with respect to the change in the dimension of the base material sheet, when the base material sheet is rewound up by the first core from the third core, an amount of change in the dimension is rewound, and thereby the distortion, the folds or the wrinkles is corrected. Thus, the entire base material sheet can contact the porous sheet, and the entire base material sheet can be modified uniformly. Moreover, also in the case where the graft polymerization rate is high (i.e. a great change in the dimension is generated), a homogeneous base material with grafted polymer chain can be obtained.

The "graft polymerization rate" is an index indicating to what extent monomers are polymerized with the base material sheet, and calculated by the following formula:

Graft polymerization rate (%)=$(W2-W1)/W1 \times 100$ where W1 is a weight of the base material sheet before the graft polymerization within a square area having a size of 100 mm (vertical)×100 mm (horizontal), viewed in a direction orthogonal to the main surface of the base material sheet, and W2 is a weight of the base material sheet after the graft polymerization within the square area having the size of 100 mm (vertical)×100 mm (horizontal), viewed in a direction orthogonal to the main surface of the base material sheet. Note that W1 is independent of a measurement position.

By manufacturing a base material with grafted polymer chain by using the method of the embodiment, nonuniformity in a graft polymerization rate within a surface of a long oriented base material sheet can be reduced. A width of the long oriented base material sheet is preferably 0.8 m or more, and more preferably 1 m or more. A length of the long oriented base material sheet is preferably 1 m or more, more preferably 2 m or more, more preferably 10 m or more, more preferably 20 m or more, and further preferably 100 m or more. The maximum value of the graft polymerization rate is, for example, 115% of an average value of the graft polymerization rate or less, and preferably 110% of the average value of the graft polymerization rate or less. The minimum value of the graft polymerization rate is, for example, 85% of the average value of the graft polymerization rate or more, and preferably 90% of the average value of the graft polymerization rate or more.

The graft polymerization rate is measured at five points that are arranged at an equal interval in the width direction of the base material sheet. One point of the five points is arranged at a position separated from one end in the width direction of the base material sheet by 0.05 m. The other point is arranged at a position separated from the other end in the width direction of the base material sheet by 0.05 m. The remaining three points are arranged between the aforementioned two points. The five points are arranged at an equal interval in the width direction of the base material sheet. The five points are arranged, in the case where the length of the base material sheet is 10 m or more, at an interval of 10 m in the longitudinal direction of the base material sheet. For example, when the length of the base material sheet is 100 m, 5×10 measurement points are arranged in total, and from the measured value obtained at the arranged fifty points, the average value, the maximum value and the minimum value are calculated. Both end portions in the width direction of the base material sheet are excluded from the measurement points of the graft polymerization rate, because a defect or a distortion may be present before the graft polymerization.

By manufacturing an ion-exchange membrane by using the method of the embodiment, nonuniformity in an ion exchange capacity within a surface of a long oriented base material sheet can be reduced. A width of the long oriented ion exchange membrane is preferably 0.8 m or more, and more preferably 1 m or more. A length of the long oriented ion exchange membrane is preferably 1 m or more, more preferably 2 m or more, more preferably 20 m or more, and further preferably 100 m or more. The maximum value of the ion exchange capacity is, for example, 115% of an average value of the ion exchange capacity or less, and preferably 110% of the average value of the ion exchange capacity or less. The minimum value of the ion exchange capacity is, for example, 85% of the average value of the ion exchange capacity or more, and preferably 90% of the average value of the ion exchange capacity or more.

The ion exchange capacity is measured at five points that are arranged at an equal interval in the width direction of the base material sheet. One point of the five points is arranged at one end portion in the width direction of the base material sheet, and the other point is arranged at the other end portion in the width direction of the base material sheet. The five points are arranged, in the case where the length of the base material sheet is 1 m or more, at an interval of 0.5 m in the longitudinal direction of the base material sheet. For example, when the length of the base material sheet is 1 m, 5×2 measurement points are arranged in total, and from the measured value obtained at the arranged ten points, the average value, the maximum value and the minimum value are calculated. A measurement area at each measurement point is a square area having the size of 50 mm (vertical)×50 mm (horizontal), viewed in a direction orthogonal to the main surface of the base material sheet.

According to the method of the embodiment, the problems such as nonuniformity in the membrane performance, distortion of a membrane surface due to nonuniformity in dimensions caused by a difference in moisture content within the membrane surface, folds, wrinkles or the like can be controlled, and thereby an excellent membrane can be provided.

In the case of applying the conventional method to the graft polymerization with a base material sheet having a length of 1 m or more, at least one of an area in which the graft polymerization rate is less than 85% of the average value of the graft polymerization rate and an area in which the graft polymerization rate is greater than 115% of the average value of the graft polymerization rate are generated.

In the present invention, the ion exchange capacity can be measured using the following method.

In the case of an anionic exchange membrane, an operation of immersing an obtained square-shaped sample of 50 mm sides into approximately 200 mL of 1 normal aqueous solution of sodium hydroxide is repeated a few times, to replace an ion exchange group of the sample by a strongly basic $OH^-$ type.

Next, an operation of immersing the sample into 500 mL of pure water is repeated, to remove excessive sodium hydroxide inside the sample.

Next, the sample is placed into a 200 mL beaker, and approximately 100 mL of 5% aqueous solution of sodium chloride is placed into the beaker. After an immersion for one hour, the ion exchange group of the sample is returned to a neutral $Cl^-$ type. The aforementioned operation is repeated until the aqueous solution of sodium chloride becomes neutral, and the aqueous solution of sodium chloride used in the aforementioned operation is collected.

For the collected liquid, a neutralization titration is performed with aqueous solution of hydrochloric acid of known concentration. An obtained titration amount is denoted as V mL. The immersed sample is extracted, repeatedly washed with pure water to remove sodium chloride in the sample, and dried at 80° C. for two hours. A dry weight is measured. The dry weight is denoted as W (g).

When the concentration of the aqueous solution of hydrochloric acid is C (mol/L), the ion exchange capacity (mmol/dry weight g) is obtained by the following formula:

$$\text{Ion exchange capacity (mmol/dry weight g)} = V \times C / W.$$

Note that the unit of the ion exchange capacity may be denoted as "mmol/g" omitting the description of "dry weight".

In the case of a cationic exchange membrane, an operation of immersing an obtained square-shaped sample of 50 mm sides approximately 200 mL of 2 normal aqueous solution of hydrochloric acid is repeated a few times, to replace an ion exchange group of the sample by a strongly acidic $H^+$ type.

Next, an operation of immersing the sample into 500 mL of pure water is repeated to remove excessive hydrochloric acid inside the sample.

Next, the sample is placed into a 200 mL beaker, and approximately 100 mL of 5% aqueous solution of sodium chloride is placed into the beaker. After an immersion for one hour, the ion exchange group of the sample is returned to a neutral $Na^+$ type. The aforementioned operation is repeated until the aqueous solution of sodium chloride becomes neutral, and the aqueous solution of sodium chloride used in the aforementioned operation is collected.

For the collected liquid, a neutralization titration is performed with aqueous solution of sodium hydroxide of known concentration. An obtained titration amount is denoted as V mL. The immersed sample is extracted, repeatedly washed with pure water to remove sodium chloride in the sample, and dried at 80° C. for two hours. A dry weight is measured. The dry weight is denoted as W (g).

When the concentration of the aqueous solution of sodium hydroxide is C (mol/L), the ion exchange capacity (mmol/dry weight g) is obtained by the following formula:

$$\text{Ion exchange capacity (mmol/dry weight g)} = V \times C / W.$$

EXAMPLE

Practical Example

Using the processing device, illustrated in FIG. 4, FIG. 6 and the like, an operation of winding out a base material sheet with a width of 1 m and a length of 100 m, which had been irradiated with an electron beam of 100 KGy, from a first core and winding up the base material sheet by a third core, and an operation of winding out the base material sheet from the third core and winding up the base material sheet by the first core were alternately repeated for five hours without stopping, to perform a polymerization reaction. In the polymerization reaction, for a processing liquid, a mixed solution of chloromethylstyrene, divinylbenzene, and xylene (weight ratio of 50:2:50) retained under a nitrogen atmosphere at 40° C. was used. The base material sheet, in which the polymerization reaction had been performed, was sufficiently washed with xylene, and washed with methanol again. Afterwards, the base material sheet was sufficiently dried and extracted. In the base material sheet after the graft polymerization, compared with a base material sheet after a graft polymerization obtained in a comparative example, described later, wrinkles and folds were controlled. The base material sheet had a width of 1.15 m and a length of 120 m.

A graft polymerization rate was measured at 60 points on the base material sheet after the graft polymerization. An average value of the graft polymerization rate was 105%, the maximum value of the graft polymerization rate was 115%, and the minimum value of the graft polymerization rate was 95%. The maximum value of the graft polymerization rate was approximately 110% of the average value of the graft polymerization rate. Moreover, the minimum value of the graft polymerization rate was approximately 90% of the average value of the graft polymerization rate.

Both edge portions with widths of 0.05 m of the polymerization membrane, obtained as above, were cut off, and a polymerization membrane with a width of 1.05 m and a length of 120 m was obtained. Using the processing device, illustrated in FIG. 4, FIG. 6 and the like, an operation of feeding the base material sheet after the graft polymerization from the first core and winding up the base material sheet by the third core, and an operation of feeding the base material sheet from the third core and winding up the base material sheet by the first core were alternately repeated for 24 hours without stopping, to perform a reaction with a processing liquid. In the reaction, for the processing liquid, 10% aqueous solution of trimethylamine retained at 35° C. was used. Thus, an anionic exchange membrane, in which all chloromethyl groups of chloromethylstyrene were modified to quaternary ammonium bases, was obtained. In the obtained anionic ion-exchange membrane, compared with an anionic ion-exchange membrane obtained in a comparative example, described later, wrinkles and folds were controlled. The ion-exchange membrane had a width of 1.15 m, and a length of 130 m.

The obtained ion exchange membrane with the width of 1.15 m and the length of 130 m was cut along two lines in the width direction separated by 1 m from each other, and thereby a sample having a width of 1.15 m and a length of 1 m was obtained. An ion exchange capacity was measured at ten points on the sample. An average value of the ion exchange capacity was 2.85 mmol/dry weight g. The maximum value of the ion exchange capacity was 2.95 mmol/dry weight g, and the minimum value of the ion exchange capacity was 2.70 mmol/dry weight g. The maximum value of the ion exchange capacity was approximately 104% of the average value of the ion exchange capacity. Moreover, the minimum value of the ion exchange capacity was approximately 95% of the average value of the ion exchange capacity. Thus, a homogeneous membrane having an excellent flatness was obtained. Note that another sample having a width of 1.15 m and a length of 1 m was cut out from the obtained anionic exchange membrane, and the aforementioned analysis was performed. A result of analysis for the other sample was the same as that of the aforementioned sample.

Comparative Example

With reference to Japanese Unexamined Patent Application Publication No. 2000-053788, a base material sheet with a width of 1 m and a length of 100 m, which had been irradiated with an electron beam of 100 KGy, was wound up with a polyethylene unwoven cloth having a thickness of 250 μm and a basis weight of 50 g/m$^2$, and immersed in a reaction vessel, in which a monomer liquid was charged, to perform a polymerization for five hours at 40° C. The base material sheet, which was washed with xylene and methanol and dried, had a width of 1.18 m and a length of 122 m. The unwoven cloth did not follow the change in the dimension of the base material sheet, and folds occurred within the base material sheet. Moreover, because circulation of a washing liquid was insufficient, a residual smell of a monomer or xylene was felt.

A graft polymerization rate was measured at 60 points on the base material sheet after the graft polymerization. An average value of the graft polymerization rate was 110%. The maximum value of the graft polymerization rate was 125%, and the minimum value of the graft polymerization rate was 60%. The maximum value of the graft polymerization rate was approximately 114% of the average value of the graft polymerization rate. Moreover, the minimum value of the graft polymerization rate was approximately 55% of the average value of the graft polymerization rate. A portion of the base material sheet where the graft polymerization rate was less than 85% of the average value of the graft polymerization rate, included a portion in which large folds occurred. Moreover, twenty or more folding portions as above were found in the base material sheet with the length of 100 m. Folds were considered to occur due to the change in a dimension of the base material sheet as the polymerization reaction proceeds, causing a contact failure between the base material sheet and the porous sheet, and preventing the polymerization reaction from proceeding.

A base material sheet after the graft polymerization was wound up with a unwoven cloth using the same method as that for the aforementioned polymerization reaction, immersed in a 10% aqueous solution of trimethylamine retained at 35° C. for 24 hours, and a anionic exchange membrane, in which all chloromethyl groups of chloromethylstyrene were modified to quaternary ammonium bases, was obtained.

A sample with a width of 1.15 m and a length of 1 m was cut out from the obtained anionic exchange membrane. An ion exchange capacity was measured at ten points on the sample. An average value of the ion exchange capacity was 2.90 mmol/dry weight g, the maximum value of the ion exchange capacity was 3.10 mmol/dry weight g, and the minimum value of the ion exchange capacity was 2.20 mmol/dry weight g. The maximum value of the ion exchange capacity was approximately 107% of the average value of the ion exchange capacity, and the minimum value of the ion exchange capacity was approximately 76% of the average value of the ion exchange capacity. The sample of ion exchange membrane had poor flatness. Moreover, a portion having distortion, wrinkles or folds was found in the sample. Although it was attempted to mount the sample of the ion exchange membrane on a large-sized electro dialysis vessel having a width of 1 m and a length of approximately 2 m, as folds occurred in the sample, a normal loading of the sample of the ion exchange membrane was difficult. Furthermore, it is easily predicted that there is great variation in a performance of an ion exchange membrane.

As described above, embodiments and the like of the processing method of a base material sheet have been described. The present invention is not limited to the embodiments or the like. Various variations and enhancements may be made without departing from the scope of the present invention described in claims.

The configuration of the processing device 30 is not limited to configurations illustrated in FIG. 2 to FIG. 8. For example, in the aforementioned embodiments, both the first porous sheet 11 and the second porous sheet 12 were used. However, only any one of the porous sheets may be used.

REFERENCE SIGNS LIST

10 base material sheet
11 first porous sheet
12 second porous sheet
21 first core
22 second core
23 third core
24 fourth core
30 processing device
33 expander roll
41 first processing liquid
42 second processing liquid

What is claimed is:

1. A processing method of a base material sheet comprising:
winding out the base material sheet wound up by a first core and a first porous sheet wound up by a second core,
winding up by a third core the base material sheet and the first porous sheet to be overlapped with each other, and
processing the base material sheet by a first processing liquid held in the first porous sheet; and
winding out the base material sheet and the first porous sheet overlappingly wound up by the third core,
winding up the first porous sheet by the second core, and winding up the base material sheet by the first core,
wherein an operation of winding out the base material sheet wound up by the first core, winding up the base material sheet by the third core, winding out the base material sheet wound up by the third core, and winding up the base material sheet by the first core again is repeated a plurality of times,
wherein the method further comprises:
replenishing the first processing liquid to the first porous sheet, during a period from the first porous sheet being wound out from the third core until the first porous sheet being wound up by the third core again.

2. The processing method of the base material sheet according to claim 1, further comprising:
causing the base material sheet, separated from the first porous sheet, to be curved along an expander roll, between the third core and the first core, to apply a tensile force to the base material sheet in a width direction of the base material sheet.

3. The processing method of the base material sheet according to claim 1, further comprising:
controlling a tensile force, applied to the base material sheet in a longitudinal direction of the base material sheet, between the third core and the first core, to be less than a tensile force, applied to the first porous sheet in a longitudinal direction of the first porous sheet, between the third core and the second core.

4. The processing method of the base material sheet according to claim 1, further comprising:
supplying the first processing liquid to the first porous sheet at a position where the first porous sheet is separated from the base material sheet.

5. The processing method of the base material sheet according to claim 1, further comprising:
winding out a second porous sheet wound up by a fourth core, when winding out the base material sheet and the first porous sheet overlappingly wound up by the third core,
winding up by the first core the base material sheet and the second porous sheet to be overlapped with each other, when winding up the first porous sheet by the second core, and
processing the base material sheet by a second processing liquid held in the second porous sheet; and
winding out the base material sheet and the second porous sheet overlappingly wound up by the first core, when winding out the first porous sheet wound up by the second core, and
winding up the second porous sheet by the fourth core, when winding up by the third core the base material sheet and the first porous sheet to be overlapped with each other.

6. The processing method of the base material sheet according to claim 5, further comprising:
causing the base material sheet, separated from the first porous sheet and the second porous sheet, to be curved along an expander roll, between the third core and the first core, to apply a tensile force to the base material sheet in a width direction of the base material sheet.

7. The processing method of the base material sheet according to claim 5, further comprising:
controlling a tensile force, applied to the base material sheet in a longitudinal direction of the base material sheet, between the third core and the first core, to be less than (1) a tensile force, applied to the first porous sheet in a longitudinal direction of the first porous sheet, between the third core and the second core, and (2) a tensile force, applied to the second porous sheet in a longitudinal direction of the second porous sheet, between the fourth core and the first core.

8. The processing method of the base material sheet according to claim 5, wherein an operation of winding out the base material sheet wound up by the third core, winding up the base material sheet by the first core, winding out the base material sheet wound up by the first core, and winding up the base material sheet by the third core again is repeated a plurality of times.

9. The processing method of the base material sheet according to claim 8, further comprising:
replenishing the second processing liquid to the second porous sheet, during a period from the second porous sheet being wound out from the first core until the second porous sheet being wound up by the first core again.

10. The processing method of the base material sheet according to claim 5, further comprising:
supplying the second processing liquid to the second porous sheet at a position where the second porous sheet is separated from the base material sheet.

11. The processing method of the base material sheet according to claim 1, wherein at least one of the first processing liquid and the second processing liquid graft polymerizes monomers with the base material sheet.

12. The processing method of the base material sheet according to claim 1, wherein at least one of the first processing liquid and the second processing liquid introduces ion exchange groups into the base material sheet.

13. A manufacturing method of a modified base material sheet comprising:
   modifying a base material sheet using the processing method of the base material sheet according to claim 1.

14. The manufacturing method of the modified base material sheet according to claim 13, wherein the modified base material sheet is configured of a base material with grafted polymer chain.

15. The manufacturing method of the modified base material sheet according to claim 13, wherein the modified base material sheet is an ion exchange membrane.

* * * * *